Patented May 23, 1939

2,159,167

UNITED STATES PATENT OFFICE 2,159,167

ALCOHOLIC BEVERAGE OF REDUCED INEBRIATING CAPACITY

Leon Lilienfeld, Vienna, Austria

No Drawing. Application January 13, 1938, Serial No. 184,898. In Austria July 11, 1932

11 Claims. (Cl. 99—30)

The present application is in major part, a continuation of my copending application, Ser. No. 678,303, filed June 29, 1933, in which I have described and claimed improved alcoholic beverages characterized by containing in solution at least one ether or ether-ester of a carbohydrate of the type $n(C_6H_{10}O_5)$, the improvement in the beverage being diminished inebriating effect. The other unfavorable effects of ethanol in beverages is also reduced, by the addition of such ethers or ether-esters.

My present invention is a modification of that described in my aforesaid specification and consists in the use of an organic acid ester of a carbohydrate of the type $n(C_6H_{10}O_5)$ for that purpose.

According to the invention beverages containing ethanol and, nevertheless, having no inebriating effect, or only a reduced inebriating effect, are obtained when, in a suitable stage of their preparation, or in their finished state, there are incorporated with them one or more organic acid esters of carbohydrates of the type $n(C_6H_{10}O_5)$ which are soluble in aqueous ethanol and in water.

The invention relates to beverages of any kind containing ethanol, for example, spirits and liquors, for instance brandy, whisky, gin, absinth or the like; liqueurs; wine of any kind; champagne or other sparkling wine; fruit wine of any kind, for example cider, perry or the like; beer of any kind; aperitifs; bitters; in short, alcoholic beverages of any kind in the finished state or in the course of their preparation. As is well known, the ethanol content of such alcoholic beverages (and in fact of all commercial alcoholic beverages) is between about 3% and about 60%, by weight.

The process comprises introducing into an alcoholic beverage in its finished or partly finished state or into one or more materials used in its preparation, or into one or more intermediate products or ingredients used in its preparation, at least one organic acid ester of a carbohydrate of the type $n(C_6H_{10}O_5)$.

I have found that only such esters of carbohydrates of the type $n(C_6H_{10}O_5)$ are capable of reducing the inebriating power of an alcoholic beverage as are to a sufficient extent soluble therein and in water. Since alcoholic beverages contain water, such esters of carbohydrates of the type $n(C_6H_{10}O_5)$ as are soluble in aqueous ethanol solution will dissolve in most alcoholic beverages.

The process may be carried out, for example, by introducing into an alcoholic beverage at least one organic acid ester of a carbohydrate of the type $n(C_6H_{10}O_5)$ which ester is soluble in the beverage and in water, by incorporating it in substance or in solution, for example in alcohol of any desired concentration or in water or in another suitable solvent, or in the form of an emulsion or suspension, either with the finished beverage or with the beverage at any stage of its preparation, or with the parent material or an intermediate material used in the preparation of the beverage in question.

When the final product is intended, besides ethanol, to contain substances imparting special taste or flavor, or sweetening substances, or juices of fruit, or syrups, or aromatic substances, such as aromatic essences or oils, or coloring matters, in short any material or materials other than ethanol, the esters of the carbohydrates or their solutions, as far as it is compatible with the nature of the respective ingredient or ingredients, may be incorporated with these materials and thereafter introduced into the alcoholic beverages, for example by incorporating them with the solution of ethanol intended for the final product which may or may not contain some other ingredients to be present in the final product.

As esters of carbohydrates suitable for my invention, the following may be named by way of example: esters of cellulose, or of starch or soluble starch, or of dextrin, or of hemicelluloses, or of amyloid, or of inulin, or of tragacanth, or of lichenin, or of agar-agar, or of glycogen or the like. The ester may be a simple ester or a mixed ester, for example a cellulose acetate or a starch acetate, or a suitable mixed ester of cellulose or starch, for example an ester including an acyl radical and a radical of a mono- or dibasic acid containing a hydroxyl group. The carbohydrate esters preferably used are those that will dissolve in dilute ethanol of the same concentration as that of the alcoholic beverages to give clear solutions, and which dissolve in pure water to give clear solutions. The preferred esters dissolve in the alcoholic beverages to give liquids which are not any more cloudy than the alcoholic beverages themselves. In many cases also the viscosity of the alcoholic beverages is not very greatly increased by the addition of the preferred esters.

The ester or esters may be introduced into the beverage in substance, for example by dissolving it or them in the finished beverage. Or the ester may, so far as is compatible with the character and nature of the beverage and other materials used or other working conditions, be dissolved in an aqueous ethanol solution of the strength selected for the final product (which aqueous ethanol solution may or may not contain some other ingredients intended for the final product or which, after having been incorporated with the ester, may be mixed with the other non-alcoholic ingredients intended for the final product) or in an aqueous ethanol solution of lower or higher strength than the strength of the ethanol intended for the final beverage. Alternatively, the ester may be incorporated with the alcoholic beverage by being dissolved or swollen in water or water-ethanol mixtures, and the paste or solution thus obtained added to an aqueous ethanol solution or to any other materials used in the preparation of the beverage.

As another alternative the ester may be added in the form of an aqueous solution to the finished beverage. The concentration of such aqueous solution will, above all, depend on the proportion of water desired in the finished alcoholic beverage. If it is intended considerably to dilute the alcoholic beverage with water, the concentration of the aqueous solution of the ester may be moderate. If, however, it is desired to add to the alcoholic beverage only a small quantity of water, the aqueous solution of the water-soluble ester must be concentrated, so that, in individual cases, it may be not a fluid solution, but a paste or a gel.

The addition to the alcoholic beverage of an aqueous solution of a water-soluble ester of a carbohydrate of the type $n(C_6H_{10}O_5)$ may be adopted in cases in which, before being taken, the alcoholic beverage is diluted. In such instances, the ester may be dissolved in the mineral water or the like, such as soda-water, which is mixed with the alcoholic beverage, such as whisky, brandy, gin, absinth, wine or the like.

As far as alcoholic beverages the preparation of which comprises fermentation, but no distillation, are concerned, the ester or esters in question may be incorporated with the parent material or intermediate product intended to be subjected to fermentation before or during the fermentation. This modification of the process is recommended, for example, in the case of beverages containing carbon dioxide, such as champagne or other sparkling wines or beer or sparkling ciders or the like, and is feasible in those cases in which the cellulose ester used is not fermentable.

I do not intend to limit the methods for introducing the ester or esters of the kind in question into the alcoholic beverages to the methods described by way of example in the foregoing paragraphs.

As to the quantity of the ester to be used, the experience gained hitherto has shown that already small amounts of the ester suffice to produce the effect of the invention. In most cases, 10 to 25 parts by weight of a suitable ester, for example a cellulose acetate soluble in aqueous ethanol and in water per 100 parts by weight of the ethanol of 100 per cent. strength contained in the beverage prove sufficient, but also more, say 30 to 60 parts or more, may be used.

If in some individual cases, alcoholic beverages are prepared according to this invention for people who are not very sensitive to ethanol even smaller quantities than 10 to 25 parts by weight per 100 parts by weight of ethanol may be incorporated with the alcoholic beverage in question.

It is impossible to indicate every condition for success in every particular case and it is to be understood that preliminary experiments cannot be avoided to find what are the conditions necessary for success when treating a particular alcoholic beverage and when using a particular ester and particular details of the incorporation of the ester with the alcoholic beverage.

*Examples*

1. In a whisky or brandy or gin or kirschwasser or wodka or starka or another liquor prepared by fermentation followed by distillation, a cellulose acetate or a starch acetate or a dextrin acetate or a cellulose propionate or a starch propionate or a dextrin propionate or a mixed cellulose acetate or an ester of cellulose or starch or dextrin containing two or more dissimilar esterifying groups, such as an ester containing an acetate and a propionate residue or an acetate, glycolate and lactate residue or an acetate, lactate and pyruvate residue, which ester is soluble in water at room temperature and in aqueous ethanol solution of 10 to 50 per cent. strength, is dissolved to an extent corresponding with 10 to 30 per cent. of the ethanol contained in the quantity of beverage to be treated according to the invention. The ester used may be dissolved in the liquor either by adding it to the liquor or vice versa; preferably with stirring, or agitation of the vessel. The operation may be performed at any time between the distillation and consumption of the liquor and should preferably be so conducted as to avoid any, or at least, any considerable decrease in the strength of the liquor by evaporation, for example by using a closed vessel for the operation.

2. The process is conducted as in Example 1, but with the difference that, instead of in substance, the ester is introduced into the liquor in the form of a concentrated solution, for example of 50 to 70 per cent. strength in a separate portion of the liquor itself or in aqueous ethanol of the strength contained in the liquor or of an approximate strength.

3. The process is conducted as in Example 1 or 2, but with the exception that, instead of the fatty acid esters used therein, esters of other saturated or unsaturated fatty acids, for example butyric acid or isobutyric acid or methyl ethyl acetic acid or caproic acid or acrylic acid are used.

Simple esters of cellulose or starch or dextrin which are soluble in water and in aqueous ethanol solution, which are referred to in the above examples, may be produced, for example, by treating cellulose or starch or dextrin with acetic acid anhydride in presence of pyridine sulphate or quinoline sulphate or a homologue thereof.

For instance, 1000 parts of cellulose or starch or dextrin are treated with a mixture of 7610 parts of acetic acid anhydride and 9400 parts of glacial acetic acid in presence of 1800 parts of pyridine sulphate at 70° C. for 45 to 75 minutes or at 50° C. for several days. The mixture is then extracted with alcohol, the extract diluted with water and dialyzed, and dialyzed solution is concentrated, precipitated with alcohol and ether, and dried.

The mixed esters referred to in the examples may be prepared, for example, in the known manner by treating cellulose aceto-lactate or starch aceto-lactate or dextrin aceto-lactate, soluble in water, with pyruvic acid.

In making esters of cellulose, there may be substituted for the cellulose a cellulose hydrate or a hydrocellulose or an oxycellulose as parent material.

Instead of the esters of carbohydrates named in the examples, the esters of other carbohydrates may be used, for example the corresponding derivatives of inulin or lichenin or vegetable gums or tragacanth or agar-agar, the methods of the preparation of the derivatives being similar to the methods described above for starch or dextrin.

If one or another ester produced by the methods just described does not give absolutely clear solutions in alcohol of strengths occurring in alcoholic beverages, for instance in alcohol of 5 to 40 per cent. strength, it may be purified by dissolving it in aqueous ethanol solution, filtering the solution and evaporating the filtrate to dryness, or precipitating it with a suitable precipitating agent, such as an alcohol-ether mixture or the like.

In all cases in which the alcoholic beverages to be treated in the present process call for cellulose derivatives, the solutions of which have a low viscosity, this object can be achieved in known manner either by, in any known manner, hydrolyzing the cellulose intended for being used as starting material with acids in the cold or at a raised temperature or in any known manner by reducing the viscosity of the cellulose derivatives themselves by treating them with dilute acid at a raised temperature with or without pressure or with strong acids in aqueous or alcoholic solution at room temperature. As far as the derivatives of starch or dextrin are concerned, in general, they have a low viscosity without any pre-treatment of the starting material or after-treatment of the final product.

The expression "carbohydrate of the type $n(C_6H_{10}O_5)$" used in the description and claims is intended to include all bodies belonging to the systems Nos. 4764 to 4774 inclusive of Beilstein's: System der organischen Verbindungen, Berlin 1929, page 144.

The term "cellulose" used in the description and claims is, wherever the context permits, intended to include cellulose, its conversion and oxidation products, such as cellulose hydrate, hydrocellulose, oxycellulose, acid cellulose or the like.

The terms "beverage containing ethanol" or "alcoholic beverage" mean, wherever the context permits, all and any beverages whatever containing ethanol and also aqueous ethanol solution if the latter is intended for use as a beverage.

The expression "alcholic beverage at any stage of its preparation" used in the description and claims is intended to include the alcoholic beverages in their finished state or any intermediate products of their preparation or any parent or any subsidiary or additional materials, in short any materials used in their preparation.

And the expression "alcoholic beverage at any stage of its preparation" is intended to include not only every stage of the preparation or treatment of alcoholic beverages, but also any stage of the preparation of alcoholic drinks by mixing alcoholic beverages with mineral water or soda-water or the like or by mixing alcoholic beverages with one another as in the case of mixed drinks, such as highballs, cocktails or cobblers or the like.

I claim:

1. An alcoholic beverage containing from 3 to 60% of ethanol, and containing in solution an organic acid ester of a carbohydrate of the type $n(C_6H_{10}O_5)$ which ester is soluble in aqueous ethanol solution and in water, the inebriating capacity of the said beverage being reduced due to the presence of said carbohydrate ester, as compared with the same alcoholic beverage but without said carbohydrate ester.

2. An alcoholic beverage containing in solution at least one substantially non-poisonous organic acid ester of a carbohydrate of the type $n(C_6H_{10}O_5)$ which ester is soluble in aqueous ethanol solution and in water, said ester being in a sufficient amount to reduce the inebriating capacity of the said beverage.

3. An alcoholic beverage containing in solution at least one substantially non-poisonous acetate of a carbohydrate of the type $n(C_6H_{10}O_5)$ which acetate is soluble in aqueous ethanol solution and in water, said acetate being in a sufficient amount to reduce the inebriating effect of the said beverage.

4. An alcoholic beverage containing in solution at least one substantially non-poisonous organic acid ester of a carbohydrate of the type $n(C_6H_{10}O_5)$ which ester is soluble in aqueous ethanol solution and in water, said ester being soluble in both the full strength beverage and in the same after dilution with water, said carbohydrate ester being in a sufficient amount to reduce the inebriating effect of the said beverage.

5. An alcoholic beverage containing in solution at least one substantially non-poisonous mixed organic acid ester of a carbohydrate of the type $n(C_6H_{10}O_5)$ which ester is soluble in aqueous ethanol solution and in water, said mixed ester being soluble in both the full strength beverage and in the same after dilution with water, said carbohydrate ester being in a sufficient amount to reduce the inebriating effect of the said beverage.

6. An alcoholic beverage which contains in solution at least one substantially non-poisonous derivative of a carbohydrate of the type $n(C_6H_{10}O_5)$ in which at least one hydroxyl hydrogen atom of the carbohydrate is substituted by an acyl group, which derivative is soluble in aqueous ethanol solution and in water and has the property, when present in solution in said alcoholic beverage, of reducing the inebriating effect of the ethanol in said beverage, and said derivative being present therein in a sufficient amount to effect that result, and which derivative is soluble both in the alcoholic beverage and in a mixture of said beverage with water.

7. An alcoholic beverage which contains in solution at least one substantially non-poisonous organic acid ester of a carbohydrate selected from the group consisting of cellulose, starch, soluble starch, dextrin, inuline, lichenin, a vegetable gum, a carbohydrate of tragacanth and a carbohydrate of agar-agar which ester is soluble in aqueous ethanol solution and in water, said ester being present in sufficient amount to reduce the inebriating capacity of the said beverage.

8. An alcoholic beverage containing between 3% and 60% of ethanol, and containing in solution, at least one substantially non-poisonous fatty acid ester of a carbohydrate of the type $n(C_6H_{10}O_5)$ which ester is soluble in aqueous ethanol solution and in water, said ester being present in a sufficient amount to reduce the inebriating capacity of the said beverage.

9. An alcoholic beverage containing between 3% and about 60% of ethanol and containing in solution at least one substantially non-poisonous carbohydrate derivative selected from the herein described group of carbohydrate derivatives consisting of simple organic acid esters and mixed organic acid esters, of cellulose, of starch, of soluble starch, of dextrin, of lichenin, of glycogen, of tragacanth and of agar-agar which carbohydrate derivative is soluble in aqueous ethanol solution and in water, said carbohydrate derivative being present in an amount sufficient to reduce the inebriating capacity of the said beverage.

10. An alcoholic beverage as set forth in claim 9, in which the carbohydrate derivative is present in an amount of about 10% to about 60% of the actual ethanol present in said beverage.

11. An alcoholic beverage which has an ethanol content, a water content and a content of the characteristic other constituents of some particular alcoholic beverage, all in about normal proportions to each other as in beverages of that kind, and containing in solution an amount of a substantially non-poisonous organic acid ester of a carbohydrate of the type $n(C_6H_{10}O_5)$ equal to at least about 10% of the ethanol present in said beverage; such beverage being of reduced inebriating quality as compared with the same alcoholic beverage without said carbohydrate ester.

LEON LILIENFELD.